United States Patent [19]

MacDonald

[11] 4,418,811
[45] Dec. 6, 1983

[54] CLUTCH WITH FAIL-SAFE HELICAL SPRING

[75] Inventor: J. G. Fraser MacDonald, Detroit, Mich.

[73] Assignee: Warner Electric Brake & Clutch Company, South Beloit, Ill.

[21] Appl. No.: 260,413

[22] Filed: May 4, 1981

[51] Int. Cl.³ .................. F16D 13/08; F16D 67/02
[52] U.S. Cl. ..................... 192/81 C; 192/12 BA; 192/37
[58] Field of Search .............. 192/12 BA, 12 R, 37, 192/81 C, 84 T

[56] References Cited

U.S. PATENT DOCUMENTS

| | | | |
|---|---|---|---|
| 3,349,880 | 10/1967 | Baer | 192/84 |
| 3,637,056 | 1/1972 | Baer | 192/12 BA |
| 3,685,622 | 8/1972 | Baer et al. | 192/35 |
| 3,915,268 | 10/1975 | MacDonald | 192/12 BA |
| 3,978,947 | 9/1976 | Modersohn | 192/12 BA |
| 4,294,339 | 10/1981 | Granger et al. | 192/81 C X |
| 4,330,054 | 5/1982 | MacDonald | 192/81 C X |

FOREIGN PATENT DOCUMENTS

| | | | |
|---|---|---|---|
| 406477 | 11/1924 | Fed. Rep. of Germany | 192/37 |
| 466928 | 12/1966 | Japan | 192/37 |

Primary Examiner—Allan D. Herrmann
Attorney, Agent, or Firm—Leydig, Voit, Osann, Mayer & Holt, Ltd.

[57] ABSTRACT

A helical spring loosely surrounds the input hub of a clutch and is adapted to be wrapped down on the input hub to couple the input hub to an output hub. Wrap down torque is applied to the spring through the tang thereof by an operating spring which acts through an axially shiftable actuator adapted to turn the tang as an incident to being shifted axially by the operating spring. If the tang of the helical spring breaks, the spring automatically unwinds and releases the input hub to effect automatic disengagement of the clutch.

5 Claims, 6 Drawing Figures

CLUTCH WITH FAIL-SAFE HELICAL SPRING

BACKGROUND OF THE INVENTION

This invention relates to a clutch of the type in which a helical spring is telescoped over rotatably mounted input and output hubs.

Such a clutch is disclosed in MacDonald U.S. Pat. No. 3,915,268. In that clutch, the spring tends to naturally wrap down into gripping engagement with both hubs to couple the output hub for rotation with the input hub. The spring is formed with a radially extending tang which is acted upon by an axially movable actuator. When the actuator is moved axially to a clutch-disengaging position, it causes the tang to turn in a direction to unwrap the spring from the input hub and thereby allow the input hub to rotate relative to the output hub. When the actuator is shifted reversely to a clutch-engaging position, the inherent resiliency of the spring causes the tang to turn in the opposite direction and causes the spring to wrap down upon the input hub and to couple the input hub to the output hub.

The clutch disclosed in the MacDonald patent is of the so-called deadman type in that the actuator normally is held in a position to effect disengagement of the clutch. The clutch can be engaged only by manually shifting the actuator and, if the actuator is manually released, the clutch automatically disengages.

SUMMARY OF THE INVENTION

The general aim of the present invention is to provide a new and improved helical spring clutch which is of the deadman type but which fails safe and automatically disengages if the tang of the spring should happen to break.

A more detailed object is to achieve the foregoing through the provision of a clutch in which the helical spring is wrapped down on the input hub only when positive torque is applied to the tang by way of the actuator and an operating spring. If the tang of the helical spring breaks, the helical spring automatically unwinds from and releases the input hub even if the actuator is held in its clutch-engaging position by the operating spring.

The invention also resides in the provision of a helical spring clutch having an operating spring which uniquely acts through an axially movable actuator to supply the wrap down torque for contracting a normally relaxed helical spring.

These and other objects and advantages of the invention will become more apparent from the following detailed description when taken in conjunction with the accompanying drawings.

DETAILED DESCRIPTION OF THE PREFERRED EMBODIMENT

Figure 1:
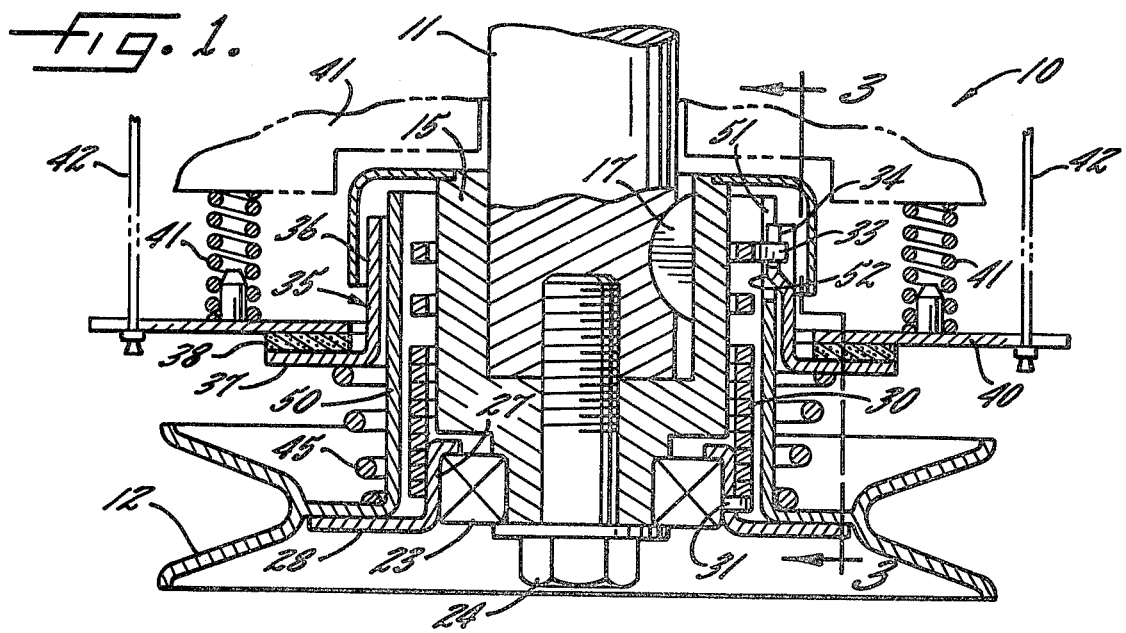
FIG. 1 is a fragmentary vertical sectional view of a new and improved clutch incorporating the unique features of the present invention, the clutch being shown in a disengaged condition.

As shown in the drawings for purposes of illustration, the invention is embodied in a clutch 10 for selectively coupling a rotatable driving element 11 to a rotatable driven element 12. In the present instance, the driving element 11 is the shaft of a motor or engine (not shown) while the driven element 12 is a pulley which forms part of the blade drive of a lawnmower. The shaft 11 extends through the deck 14 of the mower while the pulley 12 is located below the deck.

The clutch 10 comprises an input hub 15 which is keyed to the driving shaft 11 at 17. At its lower end, the input hub is reduced in diameter and supports a ball bearing 23. The bearing is held in place by a screw 24 which projects through the hub 15 and which is threaded into the lower end of the shaft 11.

The clutch 10 further comprises an annular output hub 27 which is journaled on the bearing 23 for selective rotation relative to the shaft 11 and the input hub 15. The output hub is formed with a radial flange 28 which is welded or otherwise fixed to the pulley 12 so that the output hub and the pulley turn as a unit.

Figure 6:
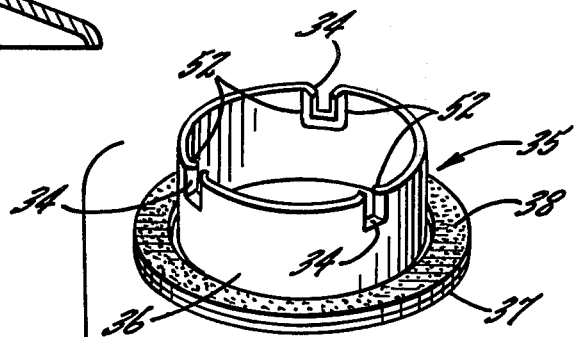
FIG. 6 is an exploded perspective view of certain parts of the clutch.
Figure 6:
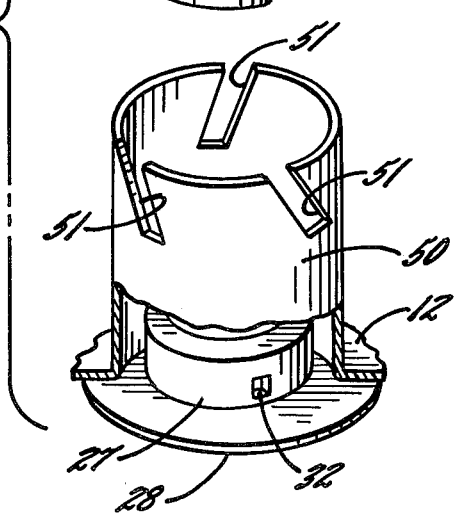

To couple the output hub 27 for rotation with the input hub 15, the clutch 10 includes a helical spring 30 which is telescoped over the hubs. The lower end of the spring 30 is formed with an inwardly projecting finger 31 (FIG. 6) which is fixed within a hole 32 formed in the output hub 27. At its upper end, the spring is formed with an outwardly projecting tang 33. The latter is received within one of three angularly spaced slots 34 formed in an actuator 35. As shown in FIGS. 1 and 6, the actuator comprises a sleeve 36 telescoped over the spring 30 and further comprises a flange 37 which projects radially outwardly from the lower end of the sleeve. A ring of friction material 38 is bonded to the upper side of the flange 37.

Figure 2:
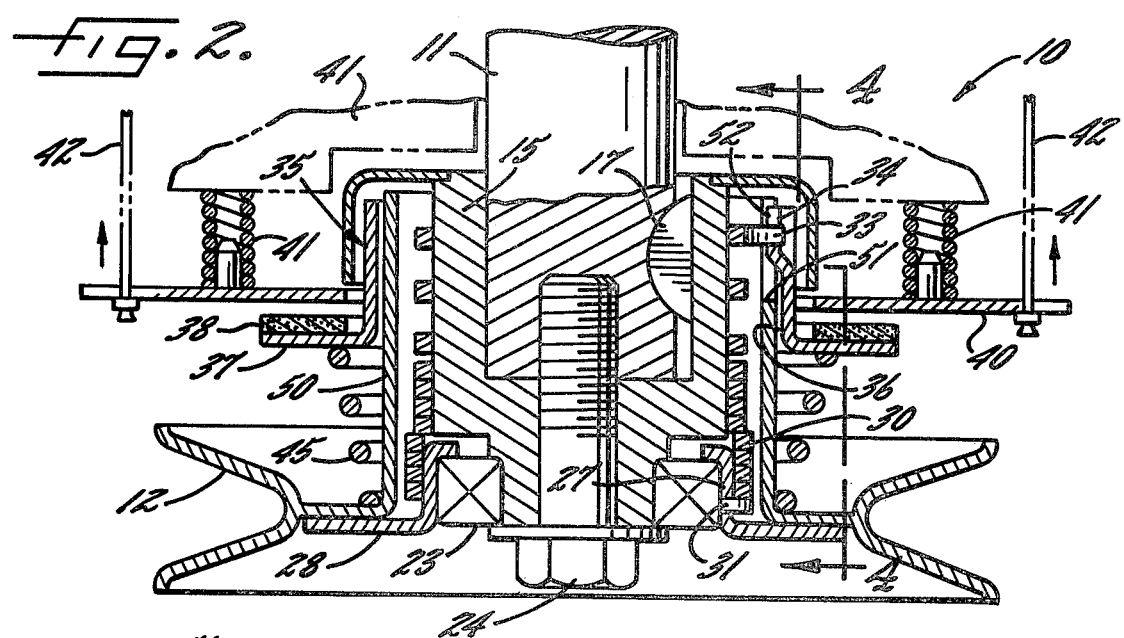
FIG. 2 is a view similar to FIG. 1 but shows the clutch in an engaged condition.
Figure 3:
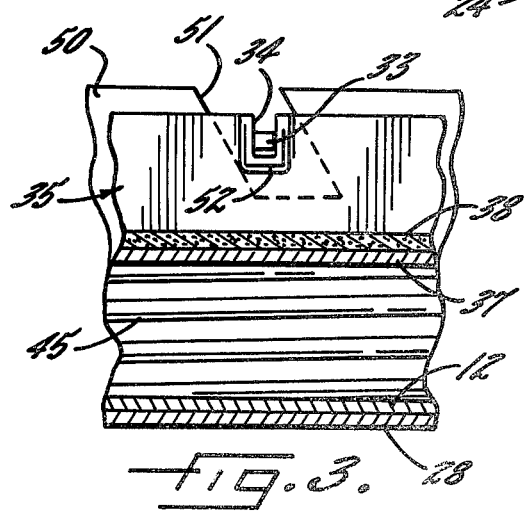
FIG. 3 is an enlarged fragmentary cross-section taken substantially along the line 3—3 of FIG. 1.
Figure 4:
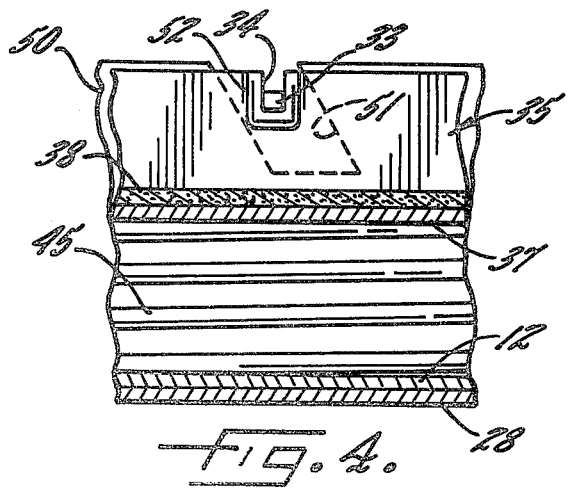
FIG. 4 is an enlarged fragmentary cross-section taken substantially along the line 4—4 of FIG. 2.

The actuator 35 normally is held in a lower clutch-disengaging position (FIG. 1) and is adapted to move upwardly or axially to a clutch-engaged position (FIG. 2). To hold the actuator downwardly in its clutch-disengaging position, a manually operable element in the form of a ring 40 is suitably supported for up and down movement beneath the deck 14 of the mower. The ring 40 is urged downwardly by a series of angularly spaced coil springs 41 which are compressed between the ring and the deck 14. The springs normally hold the ring in engagement with friction material 38 on the flange 37 of the actuator 35 so that the ring applies a braking force to the actuator. Cables 42 or the like are connected between the ring 40 and a suitable part such as an operating lever (not shown) on the mower. When the operating lever is actuated manually to pull on the cables, the ring 40 is lifted away from the friction material 38 (see FIG. 2). When the operating lever is manually released, the springs 41 force the ring downwardly into engagement with the friction material.

In accordance with the present invention, an operating spring 45 coacts uniquely with the helical spring 30 and the actuator 35 to enable the helical spring to be in a relaxed condition and in loosely surrounding relation with the input hub 15 when the clutch 10 is disengaged.

When the actuator 35 is permitted to shift upwardly to its clutch-engaged position, the operating spring 45 acts through the actuator and applies torque to the tang 33 of the helical spring 30 to cause the helical spring to wrap down on the input hub 15 and couple that hub to the output hub 27. If the tang 33 of the helical spring 30 should happen to break, the helical spring will immediately unwind from the input hub and will disengage the clutch 10 regardless of whether the actuator 35 is in its clutch-engaged or clutch-disengaged position. The clutch thus is fail-safe in that it cannot be in engagement if the tang 33 breaks.

Figure 5:
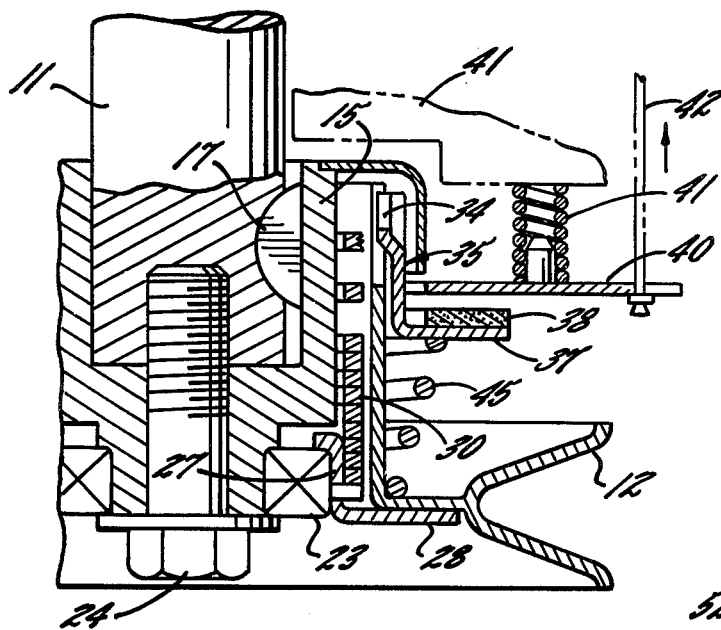
FIG. 5 is a fragmentary view similar to FIG. 2 but shows the condition of the clutch after breakage of the tang of the helical spring.

In carrying out the invention, the helical spring 30 is sized such that its inside diameter is greater than the outside diameter of the input hub 15 when the spring is relaxed. Thus, when the spring 30 is in its natural state, it loosely surrounds the input hub 15 as shown in FIGS. 1 and 5. The outside diameter of the output hub 27 is greater than the outside diameter of the input hub 15 and is somewhat greater than the relaxed inner diameter of the helical spring 30. Accordingly, the spring 30 is telescoped over the output hub with an interference fit and tends to contract around the output hub.

Further in carrying out the invention, the operating spring 45 biases the actuator 35 upwardly to its clutch-engaging position and coacts with turning means in the form of an axially fixed, sleeve-like member 50 (FIG. 6) to turn the actuator and the tang 33 as an incident to shifting the actuator upwardly. As shown in FIG. 1, the operating spring 45 herein is in the form of a coil spring which is frustoconical in shape, the spring tapering in a downward direction. The operating spring 45 is telescoped over the sleeve 50 and is compressed between the upper side of the pulley 12 and the lower side of the flange 37 of the actuator 35. Accordingly, the spring 45 urges the actuator 35 upwardly toward its clutch-engaged position.

The sleeve 50 is formed integrally with and projects upwardly from the pulley 12 and is located between the helical spring 30 and the sleeve 36 of the actuator 35. As shown in FIG. 6, the sleeve 50 is formed with three angularly spaced slots 51 which are alined with the three slots 34 in the sleeve 36 of the actuator 35. Each of the slots 51 is generally helical in shape and thus each side wall of each slot 51 defines a generally helical ramp. Lugs 52 (FIG. 6) are turned inwardly from the edges of the slots 34 in the sleeve 36 of the actuator 35 and are slidably received in the slots 51 in the sleeve 50. When the actuator 35 is shifted upwardly, the lugs 52 are cammed angularly by the side walls of the slots 51 and thus cause the actuator to turn as it shifts axially. As the actuator turns, the tang 33 of the spring 30 is turned by the side wall of the slot 34 which receives the tang.

OPERATION

The clutch 10 is shown in a disengaged condition in FIG. 1. Under these circumstances, the manual operating lever is released, the cables 42 are slack and thus the springs 41 press the ring 40 downwardly against the friction material 38 on the flange 37 of the actuator 35. The combined force of the springs 41 is greater than the force of the operating spring 45 and thus the springs 41 overcome the spring 45 and act through the ring 40 and the flange 38 to hold the actuator 35 downwardly in its clutch-disengaged position shown in FIG. 1. With the actuator 35 so located, the slots 51 in the sleeve 50 act against the lugs 52 to cause the actuator to be held in an angular position in which virtually no wrap down torque is applied by the actuator to the tang 33 of the helical spring 30. In other words, the slots 51 cause the actuator 35 to be positioned angularly such that the slot 34 which receives the tang 33 keeps the tang located in an angular position enabling the spring 30 to relax. Accordingly, the spring 30 loosely surrounds the input hub 15 and does not transmit torque to the output hub 27.

To engage the clutch 10, the ring 40 is lifted upwardly from the friction material 38 by the cables 42. The operating spring 45 thus shifts the actuator 35 upwardly and, as an incident thereto, the lugs 52 cam against the ramped walls of the slots 51 and cause the actuator to turn. As a result of such turning, the actuator applies torque to the tang 33 of the helical spring 30 and causes the helical spring to wrap down on and contact around the input hub 15. Accordingly, the helical spring couples the input hub to the output hub 27 and causes the two hubs to turn in unison.

If the tang 33 should happen to break while the actuator 35 is in its clutch-engaged position (see FIG. 5), the spring 30 simply unwinds and relaxes. Thus, the spring automatically releases the input hub 15 and effects automatic disengagement of the clutch 10. The clutch will remain disengaged until the helical spring is replaced. Accordingly, failure of the tang completely disables the clutch and eliminates any potential hazard which can occur with a clutch in which the spring naturally contracts around the input hub and can be released therefrom only by the application of a positive external unwinding torque to the tang.

I claim:

1. A clutch comprising rotatably mounted input and output hubs, a radially contractible helical spring telescoped over said hubs and having one end turnable with said output hub, said spring having a relaxed inner diameter which is greater than the outer diameter of said input hub whereby the spring loosely surrounds the input hub when the spring is relaxed, an actuator movable axially of said hubs between a clutch-engaged position and a clutch-disengaged position, means for turning said actuator as said actuator is moved axially between said positions, the other end of said spring being connected to said actuator and turning in a direction to cause said spring to contract around and grip said input hub when said actuator turns upon being moved axially to said clutch-engaged position, and a second spring acting on said actuator and biasing said actuator axially toward said clutch-engaged position.

2. A clutch as defined in claim 1 in which the outer diameter of said input hub is less than the outer diameter of said output hub.

3. A clutch as defined in claim 2 in which the relaxed inner diameter of said helical spring is less than the outer diameter of said output hub.

4. A clutch as defined in claim 1 in which said turning means comprise an axially fixed member, and a helical ramp connecting said actuator with said member and operable to cause said member to turn said actuator when the latter is moved axially.

5. A clutch as defined in either of claims 1 or 4 further including spring means biasing said actuator axially toward said clutch-disengaged position, the axial force exerted on said actuator by said spring means being greater than the axial force exerted on said actuator by said second spring.

* * * * *